Dec. 10, 1940.   C. C. ABBOTT   2,224,584
SOLDERING IRON
Original Filed July 30, 1936

Inventor:
Charles C. Abbott,
by Harry E. Dunham
His Attorney.

Patented Dec. 10, 1940

2,224,584

UNITED STATES PATENT OFFICE 2,224,584

SOLDERING IRON

Charles C. Abbott, Pittsfield, Mass., assignor to General Electric Company, a corporation of New York Original application July 30, 1936, Serial No. 93,411. Divided and this application March 22, 1938, Serial No. 197,353

5 Claims. (Cl. 113—105)

This invention relates to handle structures, more particularly to handle structures for electrically heated tools, such as soldering irons and the like, and it has for its object the provision of an improved device of this character.

This invention contemplates the provision of an improved handle structure involving means for adjusting the handle with reference to the working part of the tool, such as the tip of a soldering iron; and further, contemplates improvements in the handle structure for thermally insulating the handle from the working part of the tool.

This application is a division of my copending application, Serial No. 93,411, filed July 30, 1936, and assigned to the same assignee as this invention.

Figure 1:
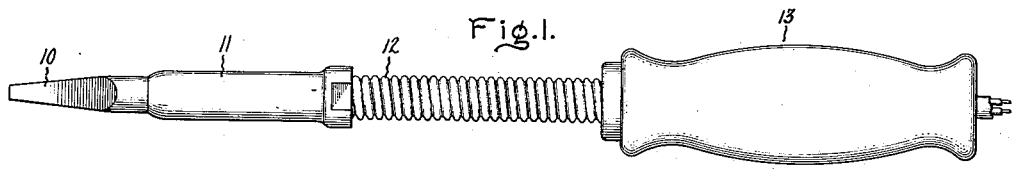
Figure 2:
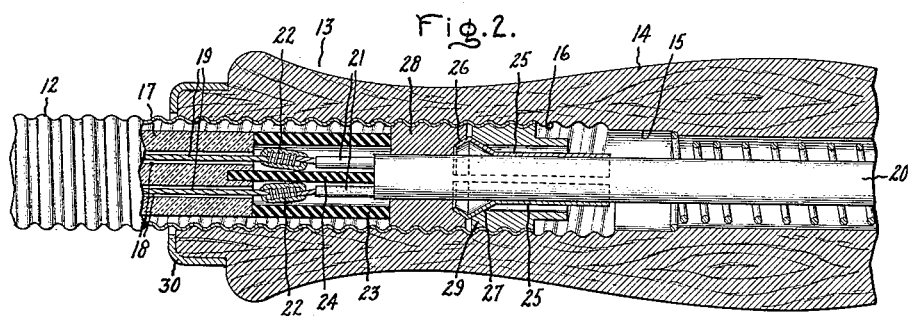
Figure 3:
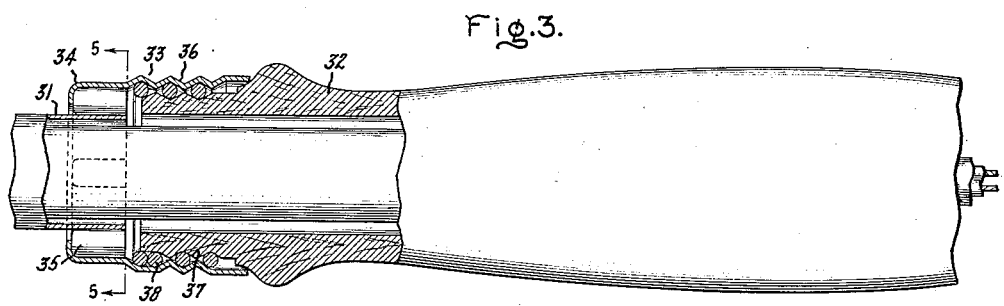
Figure 4:
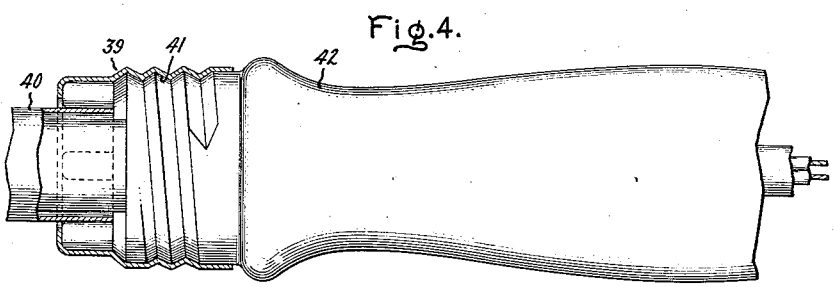
Figure 5:
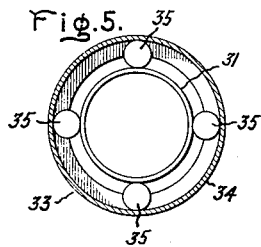

For a more complete understanding of this invention, reference should be had to the accompanying drawing in which Fig. 1 is an elevation of a soldering iron provided with a handle structure arranged in accordance with this invention; Fig. 2 is an enlarged fragmentary elevation mainly in section illustrating the handle structure used in the soldering iron of Fig. 1; Fig. 3 is an enlarged fragmentary elevation of a handle structure involving improved means for thermally insulating the handle arranged in accordance with this invention; Fig. 4 is a fragmentary elevation of a handle structure of modified form arranged in accordance with this invention, parts being shown in section so as to illustrate certain details of construction; and Fig. 5 is a sectional view taken through the line 5—5 of Fig. 3 and looking in the direction of the arrows.

Referring to the drawing, this invention has been shown in one form as applied to a soldering iron having a working tip 10, which is heated by an electrical heating unit 11; a metallic support 12 for the heating element and tip; and a handle structure 13 secured to the metallic support, whereby the iron may be manipulated.

The tip 10 and heating unit 11 are arranged in the manner described and claimed in my above-mentioned copending application.

The heating unit 11 is threaded on the support 12 which is threaded from end to end, as shown. Preferably, the threads on the support 12 will be formed by rolling or spinning them from the stock of the walls of the tube itself, as clearly shown in Figs. 1 and 2. This provides a relatively large thread as shown, and increases the length of the heat path from the heating element to the handle structure 13.

The metallic support at its end opposite the tip is received in the handle, or hand-grasping member 14 of the handle structure. The handle 14 is provided with a centrally arranged bore 15 having its tip end portion 16 threaded to receive the handle end of the metallic support 12.

Extending longitudinally through the metallic member 12, substantially from end to end thereof, is an insulating member 17 provided with a pair of spaced-apart passageways 18 through which a pair of leads 19 connected to the terminals of the heating element are directed. The member 17 is formed of any suitable material, such as porcelain. The leads 19, as shown, project from the end of the insulator 17 into the tube 12.

Entering the bore 15 of the handle is a suitable electrical supply lead 20 comprising a pair of supply conductors 21 which are insulated and which are covered by a common insulating coating, as shown, formed of any suitable electrically insulating yielding material, such as rubber. The ends of the conductors 21 are bared, as shown, and are arranged in overlapping relation with the associated ends of the leads. The overlapped ends of the leads and conductors are secured together by means of conducting wires 22 tightly wound about the ends, as shown in Fig. 2, and soldered after being wound. An insulating sleeve 23 is inserted in the tubular member 12 about the portions of leads and conductors connected together, and these portions are separated by an insulating wall 24. These members 23 and 24 preferably will be formed of a suitable insulating fiber.

The lead 20 is secured in the handle 14 against withdrawal by means of a pair of curved clamping members 25 positioned within the support 12 on opposite sides of the insulating coating of the lead, as shown. These members 25 are provided with oppositely inclined surfaces 26 and 27, preferably arranged at the tip end of the clamps. These inclined surfaces are arranged between a pair of clamping nuts 28 and 29 positioned on opposite sides of the surfaces and having threading engagement with the tubular support 12. The nuts as shown have wedging or inclined faces engaging the inclined faces 26 and 27 of the clamps, and the nuts are turned inwardly toward each other sufficiently to force the clamping members 25 tightly against the insulated covering of the lead. Preferably, the inner nut 28 will be fitted tightly against the insulating sleeve 23 to hold it in place, and will be rigidly secured to the support in any suitable manner, as by brazing.

It will be understood that the threaded connection between the handle 14 and the support 12 provides means whereby the position of the handle can be adjusted relative to the heating unit and tip organization. It may be threaded inwardly or outwardly with reference to the working tip to any suitable position on the tube 12.

The handle 14 at its tip end is encircled by a metallic ferrule 30 which is spaced from the metal support 12 to reduce the transfer of heat from the support to the handle.

In the form of the invention shown in Fig. 3, the supporting member 31 is of straight tubular form and is not threaded as is the corresponding support of the first form. The tube 31, as shown, is connected to the handle 32 by a connection means preventing direct conduction of heat from the support 31 to the handle. As shown, a handle ferrule 33 is provided between the tube 31 and the handle 32. This ferrule, as shown, has a portion 34 surrounding the tube 31 in spaced relation with it and within this space there are provided a plurality of pins 35 spaced circumferentially of the tube, as shown in Fig. 5. These pins have diameters such that they space the ferrule in substantially concentric relation with the tube 31, and so as to have line contact with the tube and ferrule. The pins 35 are rigidly secured to the tube and ferrule at the lines of contact with them in any suitable manner, as by copper brazing.

The ferrule 33 is provided with a threaded section 36 which is positioned opposite a threaded section 37 provided on the handle. Lying within the threads on the handle and ferrule is a coiled member 38 formed of circular stock. This member, it will be observed, contacts the ferrule and handle with line contacts only.

It will be observed in view of the foregoing arrangement that the ferrule 33 is spaced a material distance from the metallic support 31 by the pins 35 and has very small direct thermal contact with the support. Also, it will be observed that the ferrule is supported in spaced relation with the handle by means of the coiled member 38 which has but line contact with the ferrule and handle. The handle is, therefore, thermally insulated from the tube 31, and consequently, from the heating element and tip organization.

In the modified form of the invention shown in Fig. 4, the ferrule 39 is secured in the same manner to the tubular support 40 as is the ferrule 33 secured to the tube 31 of Fig. 3. In this case, however, the ferrule has a direct threaded connection 41 with the handle 42. In other words, the member 38 has been eliminated in this form. This form is particularly applicable to low voltage irons, such as those having a heating unit of 75 watts.

While I have shown particular embodiments of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In a tool and the like having a heated element, a handle structure comprising a handle, a ferrule connected with said heated element surrounding a portion of said handle in spaced relation with it, threads both in said ferrule and said handle portion, and a coiled member of substantially circular cross-section inserted within the space between said ferrule and handle portion and received in the threads in said members so as to hold them in spaced relation and to reduce the transfer of heat from said ferrule to said handle.

2. In a tool and the like having a working portion adapted to be heated, a first metallic member supporting said working portion, a handle for said metallic member, a second metallic member secured to said handle and having a portion surrounding said first metallic member in spaced relation with it, and metallic means inserted in the space between said first and second metallic members rigidly securing them together at spaced intervals so as to thermally insulate said handle from said first metallic member.

3. In a soldering iron and the like comprising a working tip, a metallic member supporting said tip, a handle, a ferrule secured to said handle having a portion surrounding said metallic member in spaced relation with it, a plurality of pins arranged at intervals in the space between said portion and said ferrule, and means securing said pins to said portion of said ferrule and said metallic member.

4. In a soldering iron and the like comprising a working tip, a metallic member supporting said tip, a handle, a ferrule secured to said handle having a portion surrounding said metallic member in spaced relation with it, a plurality of pins arranged lengthwise in the space between said portion and said metallic member spaced at intervals and having line contact with said members, and said pins brazed to said portion and to said metallic members.

5. In a soldering iron and the like comprising a working tip, a metallic member supporting said tip, a handle, a plurality of pins longitudinally positioned on said metallic member at spaced intervals around the member, means rigidly securing said pins to said member, and means securing said pins to said handle.

CHARLES C. ABBOTT.